Patented Oct. 29, 1935

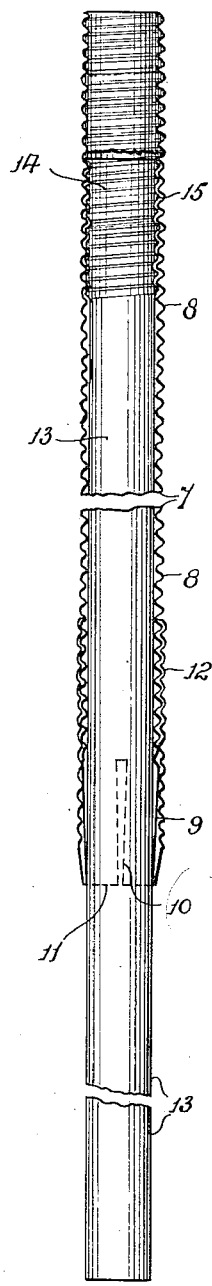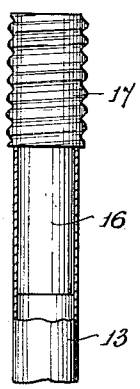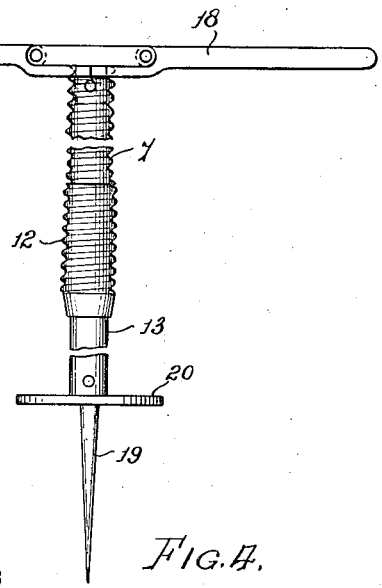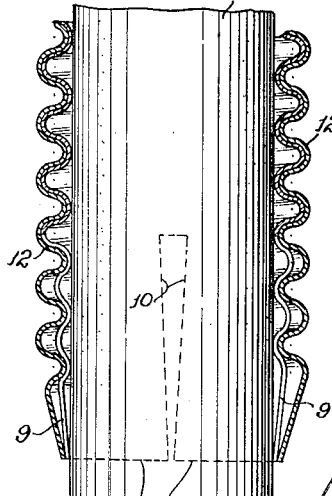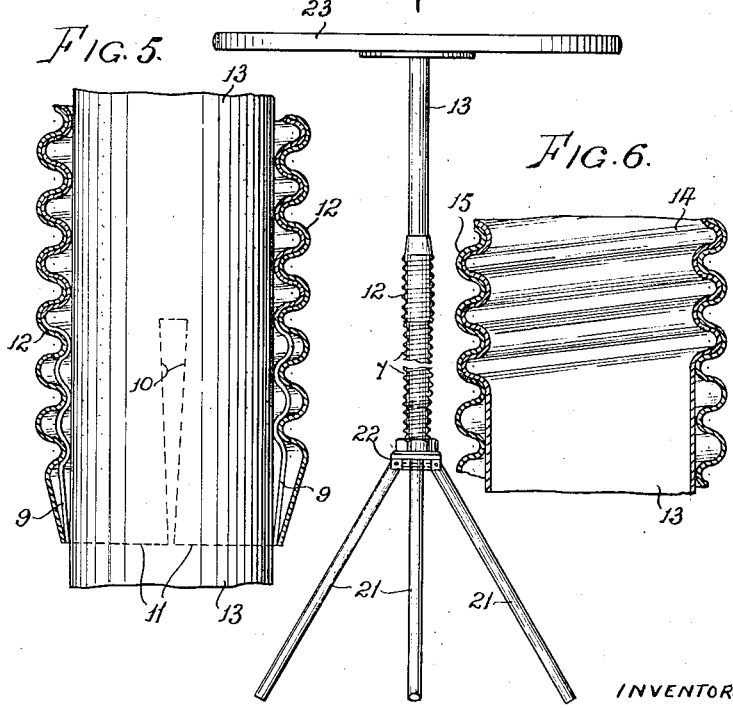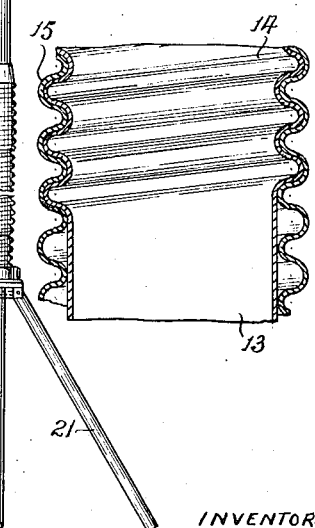

2,019,259

UNITED STATES PATENT OFFICE 2,019,259

MEANS FOR ADJUSTING THE LENGTH OF COAXIAL AND OVERLAPPING TUBES, OR TUBES AND RODS

James Bertram Holt, Dunham Town, near Altrincham, England

Application February 2, 1934, Serial No. 709,476
In Great Britain February 4, 1933

2 Claims. (Cl. 287—62)

This invention has reference to means for adjusting the length of co-axial and overlapping tubes or tubes and rods and has for its object to provide a simple and efficient means whereby overlapping and co-axial tubes may be adjusted longitudinally for various uses such as tripod legs, shooting sticks or golf club shafts and which shall be firm and rigid in all positions to which they can be adjusted.

According to this invention longitudinal adjustment of a tube with other tubes or rods is provided by forming an internal and external screw thread in a tube into which other tubes or rods are to be fitted, and forming a corresponding screw on one end of the rod or tube to be fitted into the larger tube, the end or ends of the larger tube being externally tapered and split and provided with a ferrule tapered internally and screwing on the outside of the larger tube to bind the split end on the smaller tube or rod.

The invention is more particularly set forth with reference to the accompanying drawing wherein—

Fig. 1 is a sectional elevation showing two tubes arranged according to the invention.

Fig. 2 is a part sectional elevation showing an alternative arrangement of providing a screw thread on the inside tube.

Fig. 3 shows the application of the invention to a shooting stick.

Fig. 4 shows the application to a low stool.

Fig. 5 is an enlarged view showing the securing device and

Fig. 6 is an enlarged sectional elevation of the top end of the arrangement shown in Fig. 1.

In the embodiment of the invention shown in Fig. 1 which shows the invention in one of its most useful forms namely a golf club shaft, a length of tube 7 is provided with an internal and external screw thread 8 which is impressed into the wall of the tube instead of being cut. The lower end of this tube is tapered down to a thin edge at 9 and for a short distance inward from the end this tapered portion has slots 10 which form two or more tongues 11 between them and which tongues can be bent inwards. A screwed and internally tapered ferrule 12 is provided which can be screwed on the lower end of the screwed tube 7 and which when screwed up forces the tongues 11 inward or, when screwed down allows them to expand under their own elasticity when released from pressure.

A tube 13, or it may be a rod which is just small enough to slide easily inside the screwed tube 7 is screwed at one end 14 conveniently by slightly enlarging one end for a short distance and screwing this enlarged portion. Thus the smaller tube can be screwed up and down in the larger tube to adjust the total length and when adjusted is secured by the ferrule already referred to. In order to effect this the end must be bulged as shown in Figs. 1 and 6 and a screw thread 17 formed thereon. But if desired, to avoid this operation, a plug 16 may be inserted in the tubes as shown in Fig. 2 or may be secured as by welding to the end of a rod where a rod is used the plug 16 having a thicker top 17 on which the desired screw thread may be cut or otherwise formed.

When it is desired to adjust the length, the ferrule 12 is screwed down to release the tongues 11 and the larger tube 7 and the smaller tube 13 are turned relatively until the desired lengthening or shortening is effected after which the ferrule is screwed up again to bind the two invisibly together.

As already stated Fig. 1 shows the adaptation of the invention to a golf club shaft but it may be adapted to a variety of purposes such as for fishing rods or shafts of other articles akin to golf clubs such as for example, croquet mallets.

In Fig. 3 the invention is shown as applied to a shooting stick where the seat 18 of the usual kind in such sticks is mounted on the end of the large screwed tube 7, the point 19 and stop 20 being on the lower end of the smaller tube 13 and the ferrule 12 being mounted on the larger tube as in Fig. 1.

In Fig. 4 the invention is shown as applied to a collapsible three legged stool in which the legs 21 are pivoted on the underside of a boss 22 having a screwed projection on the top to which the larger tube 7 is secured the smaller tube 13 projecting from the top and the ferrule 12 being mounted on the larger tube, the seat 23 being permanently or detachably secured in the end of the smaller tube 13. With both these arrangements the adjustment is secured in the manner already set forth with reference to Fig. 1.

Instead of using a smaller tube inside a larger tube a rod may be used or if desired two smaller tubes or rods may be inserted in opposite ends of a larger tube in which event the larger tube will have resilient tongues and screw ferrules at both ends.

Although the invention has been described with reference to one larger tube having one smaller rod or tube within it, it will be understood that more than two such elements or parts may be used as for instance the smaller tube may be internally screwed for a distance from its free end and a further tube or rod inserted therein in the manner already described, and it will be appreciated that where more than two elements or members are so used only the first and smallest one can be a rod.

What I claim as my invention and desire to secure by Letters Patent is:—

1. An adjustable length joint for co-axial members, comprising a tube, screw threads formed at the same time on the inside and outside by deforming the tube wall, slots in said tube wall extending inwardly for a short distance from the end of said tube, a tapered external form of said tube extending over a distance corresponding in the length of said slots, said external screw thread decreasing in depth and finally disappearing along and toward the end of said tapered portion, a screwed and internally tapered ferrule screwable on the outside of said tube, a circular rotatable member slidable in said tube, an enlargement at one end having a screw thread screwable in the internal thread in said tube, whereby the length of said joint is adjustable, said ferrule allowing relative adjustment in said joint when screwed along said tube and preventing adjustment when screwed inwards by closing the ends of said tube between said slots inwardly and binding on said rotatable circular member inside.

2. An extension joint comprising an inner cylindrical member, an inner tube having a continuous spiral corrugation to provide both external and internal threads and having a split and tapered end, said tube being fitted on the inner member with the split end closely embracing said inner member, said inner cylindrical member having a portion provided externally with a spiral corrugation fitting the internal corrugation of said inner tube, and an outer tube similarly corrugated and having a tapered end forming a continuous hollow frustum of a cone and engaging over the tapered end of the inner tube to compress the same.

JAMES BERTRAM HOLT.